United States Patent
Benoit et al.

(10) Patent No.: US 11,084,604 B2
(45) Date of Patent: Aug. 10, 2021

(54) AIRCRAFT ROTOR WITH EMBEDDED OPTICAL FIBER SENSOR

(71) Applicant: Hamilton Sundstrand Corporation, Charlotte, NC (US)

(72) Inventors: Jeffrey T. Benoit, Willington, CT (US); Abdellah El Haloui, Figeac (FR)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/284,624

(22) Filed: Feb. 25, 2019

(65) Prior Publication Data

US 2019/0322392 A1    Oct. 24, 2019

(30) Foreign Application Priority Data

Apr. 20, 2018 (EP) ..................... 18305488

(51) Int. Cl.
*B64C 11/20* (2006.01)
*B64F 5/60* (2017.01)

(52) U.S. Cl.
CPC ............... *B64F 5/60* (2017.01); *B64C 11/20* (2013.01)

(58) Field of Classification Search
CPC ........ B64F 5/60; B64C 11/20; G01M 5/0041; G01M 5/0091; G01M 5/0016
See application file for complete search history.

(56) References Cited

U.S. PATENT DOCUMENTS 4,930,852 A * 6/1990 Wheeler ............... G01M 11/086
250/227.11
5,844,669 A 12/1998 Wang et al.
8,260,093 B2 * 9/2012 Care ................... G01M 5/0016
250/227.11
8,333,551 B2 12/2012 Ruggiero et al.
8,451,013 B1 * 5/2013 Hsiao ................. G01M 5/0083
324/600

(Continued)

FOREIGN PATENT DOCUMENTS

GB      2124784 A      2/1984
WO  2009063181 A1      5/2009

OTHER PUBLICATIONS

Ruohui Wang and Xueguang Qiao, Intrinsic Fabry-Perot Interferometric Sensor Based on Microfiber Created by Chemical Etching, 2014, MDPI, Sensors 2014, 14, 16808-16815 (Year: 2014).*

(Continued)

*Primary Examiner* — Eldon T Brockman
(74) *Attorney, Agent, or Firm* — Cantor Colburn LLP (57) ABSTRACT

A blade for a propeller including a blade composite structure includes a Fiber Bragg Grating (FBG) or an Extrinsic Fabry-Perot Interferometric (EFPI) sensor embedded in the blade composite structure. The sensor is configured to receive a signal from a controller operatively connected to the FBG or EFPI sensor, and transmit a signal, responsive to the received signal, to a processor operatively connected to the sensor. The signal response is indicative of a stress measurement indicating a structural characteristic of the blade composite structure. The signal response provides information to determine, based on the signal response, whether the structural characteristic of the blade composite structure is within a predetermined limit indicative of structural integrity of the blade composite structure.

15 Claims, 4 Drawing Sheets

(56) References Cited

U.S. PATENT DOCUMENTS

| | | | |
|---|---|---|---|
| 8,454,013 B2 | 5/2013 | Hsiao | |
| 9,063,032 B2 * | 6/2015 | Appuhamillage | ... G01M 11/083 |
| 9,566,754 B2 | 2/2017 | Olesen | |
| 2005/0013526 A1 | 1/2005 | Lee et al. | |
| 2009/0020212 A1 | 1/2009 | Cacace | |
| 2010/0278476 A1 * | 11/2010 | Care | ... G01M 5/0016 |
| | | | 385/13 |
| 2013/0268471 A1 * | 10/2013 | Appuhamillage | .. G01M 5/0041 |
| | | | 706/17 |
| 2015/0098819 A1 | 4/2015 | Tourin et al. | |

OTHER PUBLICATIONS

"Aerospace: Health and Usage Monitoring to increase performance, availability and safety"; Smart Fibres Ltd (2019). https://www.smartfibres.com/aerospace; Accessed Feb. 25, 2019; 5 pgs.

European Search Report for Applcation No./Patent No. 18305488.1-1001 dated Oct. 26, 2018; 8 pgs.

* cited by examiner

AIRCRAFT ROTOR WITH EMBEDDED OPTICAL FIBER SENSOR

CROSS-REFERENCE TO RELATED APPLICATIONS

This application claims the benefit of European Patent Application No. 18305488.1 filed Apr. 20, 2018, which is incorporated herein by reference in its entirety.

BACKGROUND

Exemplary embodiments pertain to the art of aircraft propulsion, and more specifically, to an aircraft propeller with embedded optical fiber sensor as well as the manufacture of fiber reinforced composite bodies of a spar and shell construction and, more specifically, to the manufacture of lightweight propulsor blades, such as propeller blades, propfan blades, turbo-fan blades and the like constructed of a composite load bearing spar supporting a composite fiber reinforced shell, by resin transfer molding methods.

BACKGROUND ART

In aircraft applications it is highly desirable to minimize the weight of aircraft components as every pound saved in aircraft weight translates to fuel savings and/or greater payload capacity. With respect to propeller, turboprop or turbofan aircraft engine components, it is well appreciated that the propulsor blades are the most likely candidate for weight reduction since the weights of other related components, e.g. blade retention means, pitch change mechanisms, hub disks, shafts and bearings, are typically directly dependent upon the magnitude of the blade centrifugal loading borne by these components. The propulsor blades per se, however, can be made lighter in weight so long as the centrifugal pull, bending moments, torsion loads and vibratory loads, imposed upon the blades during operation are effectively transmitted to the blade retention means for distribution to the before mentioned load bearing components.

It is known in the art to produce lighter weight propulsor blades of a built-up construction. According to known techniques, a blade is formed of an outer shell made of lightweight composite material, and an internal load bearing spar which is bonded to the interior surface of the shell. The spar extends from within the shell cavity to terminate beyond the shell in a root end which is adapted to be mounted to a suitable blade retention means such as a retention tulip.

It has become conventional practice in the aircraft industry to manufacture such blades with a shell formed about the load bearing spar as a molded fiber reinforced resin body using resin transfer molding methods. Such fiber reinforced resin shells exhibit high strength and low weight characteristics and in aircraft applications typically offer at least as high strength as corresponding articles made of metal at a substantially lower weight. For, example, one such method includes making a fiber reinforced airfoil shaped propeller blade assembly with multiple layers of woven fiberglass cloth that are layered up over a foam underbody. The foam underbody is formed by injecting a lightweight foam material into a mold disposed about an adhesive coated full length metallic spar. After curing, the molded underbody is wrapped in multiple layers of the fibrous reinforcing fiberglass cloth, each of the fiberglass layers being trimmed to its desired contour and then hand stitched, a labor intensive practice, in place over the foam underbody. This subassembly is then placed in a second mold and a synthetic polymeric material such as epoxy resin is injected into the fiber matrix and then cured. Alternatively, the resin may be applied to the fibrous cloth of the wrapped subassembly before it is placed into the curing mold. The fibrous cloth may include, or in lieu of the cloth, windings of carbon fibers that reinforce the underbody. Some steps, such as the curing or hand stitching may place various forces on the structures during manufacture that could exceed recommended strain for the various materials. Unfortunately it is not easy to identify whether such forces were applied during manufacturing.

Hand stitching may be eliminated by adhesively bonding each fiberglass layer to the layer beneath. To do so, the fiberglass material is provided on its underside with a thermoplastic adhesive. The material is then trimmed to shape and placed in position over the subassembly. The adhesive is then activated by heat and pressure by means of an electric resistance heated iron applied to the surface of the fiberglass material. Although the use of such adhesive coated fiberglass material does indeed eliminate the need for hand stitching, this method of laying up the fiberglass layers is still quite labor intensive and a seam must still be formed. Internal layers may be damaged if heat is over-applied to the fiberglass layers.

Another method for manufacturing a light-weight rotary machine blade includes the steps of: installing an elongated core of lightweight cellular foam material into a receiving cavity defined by the flared distal end of a foreshortened metal spar so as to extend axially outwardly of the metal spar. A laminate fiber wrap of alternating plies of spanwisely oriented graphite fibers is layered up on the cellular foam, and angularly woven plies of high strength aramid fibers about this spar subassembly to form a preliminary composite assembly. The leading and trailing edge fillers of lightweight foam material are molded to the preliminary composite assembly to form the desired contoured shape of the blade, thereafter laying up a laminate wrap of layered plies of high strength aramid fibers about this entire shaped subassembly except for the root end of the spar. The wrapped subassembly is shaped and placed into a conforming mold, and the wrapped shaped subassembly is impregnated with an epoxy resin via resin transfer molding techniques to yield a resin reinforced assembly which upon curing constitutes the lightweight composite blade.

Integrity between the layers of aramid fibers, between the aramid fibers and the lightweight foam, and at the intersections of the leading and/or trailing edge(s) and the material proximate to the edge(s) can experience stresses during these described manufacture steps, or other steps, that may weaken the integrity of the assembly. Internal temperatures, stresses and other parameters during these manufacturing steps cannot be easily measured without destructive testing of a representative sample. Similar to measurement and monitoring limitations during manufacture, in the field (during flight, for example) it is currently difficult to measure stresses and wear between internal layers of material that make up the blade of the propeller.

BRIEF DESCRIPTION

Disclosed is a blade for a propeller that includes a blade composite structure. The blade includes a Fiber Bragg Grating (FBG) sensor embedded in the blade composite structure. The sensor is configured to receive a signal from a controller operatively connected to the FBG sensor, and transmit a signal, responsive to the received signal, to a processor operatively connected to the sensor. The signal response is indicative of a structural characteristic of the blade composite structure. The signal response provides information to determine, based on the signal response, whether the structural characteristic of the blade composite structure is within a predetermined threshold indicative of the desired structural integrity of the blade composite structure.

In addition, any prior blade embodiment can be formed such that the blade composite structure comprises a first layer and a second layer in connection with the first layer, and the FBG sensor is embedded between the first and second layers.

In addition, in any prior blade embodiment the signal response is indicative of a residual stress build-up in the blade composite structure.

In addition, in any prior blade embodiment the signal response is indicative of microstrain (μstrain).

In addition, in any prior blade embodiment determining the structural characteristic comprises: retrieving, via the controller, one or more signal responses operatively saved to a computer-readable memory; evaluating, via the controller, a cumulative residual stress build-up based on the one or more signal responses; and outputting, using the controller, a message indicative of the cumulative residual stress build up.

Also disclosed is a method for monitoring a physical characteristic of a blade composite structure. The method includes transmitting, via a controller, a signal to a Fiber Bragg Grating (FBG) sensor embedded in the blade composite structure, receiving a signal response from the FBG sensor at the controller indicative of a stress measurement indicating a structural characteristic of the blade composite structure, and determining, using the controller, based on the signal response, whether the structural characteristic of the blade composite structure is within a predetermined limit indicative of structural integrity of the blade composite structure.

In one embodiment the method further includes, forming a portion of the blade and then transmitting the signal to the FBG sensor. In the event that the received signal is within the predetermined limit, further portions of the blade are then formed. In the event they are not, further blade portions are not formed and the blade being formed can be scrapped. This achieves a technical effect of ensuring that blades with desired characteristics are formed and that further effort/expense is not spent finishing a defective blade. Such processing also applicable to any prior blade disclosed above or system below. Further, the sensor information can be used to determine that a blade needs maintenance and repair and the method/system can include causing the blade maintenance and/or repair.

In any prior method, the blade composite structure comprises a first layer and a second layer in connection with the first layer, and the FBG sensor is embedded between the first and second layer.

In any prior method, the signal response is indicative of a residual stress build-up in the blade composite structure.

In any prior method, the signal response is indicative of μstrain.

In any prior method, determining the structural characteristic comprises: retrieving, via the controller, one or more signal responses operatively saved to a computer-readable memory; evaluating, via the controller, a cumulative residual stress build-up based on the one or more signal responses; outputting, using the controller, a message indicative of the cumulative residual stress build up; and transmitting, using the controller, the message to a second processor.

Also disclosed is a system for monitoring a physical characteristic of a blade composite structure. The system includes a blade composite structure, an Extrinsic Fabry-Perot interferometric (EFPI) sensor embedded in the blade composite structure, and a controller operatively connected to the sensor. The controller is configured to transmit a signal to the sensor using a processor, and receive, using the processor, a signal response from the sensor indicative of a structural characteristic of the blade composite structure. The controller determines, using the processor, based on the signal response, whether the structural characteristic of the blade composite structure is within a predetermined threshold indicative of the desired structural integrity of the blade composite structure.

In any prior system, the blade composite structure comprises a first layer and a second layer in connection with the first layer, and the FBG sensor is embedded between the first and second layers.

In any prior system, the signal response is indicative of a residual stress build-up in the blade composite structure.

In any prior system, the signal response is indicative of μstrain.

In any prior system, determining the structural characteristic comprises: retrieving, via the controller, one or more signal responses operatively saved to a computer-readable memory; evaluating, via the controller, a cumulative residual stress build-up based on the one or more signal responses; outputting, using the controller, a message indicative of the cumulative residual stress build up; and transmitting, using the processor, the message to a second processor.

In any prior system, the system includes comprising a non-transitory computer-readable storage medium storing program instructions that, when executed by the controller, cause the controller to: transmit the signal to the FBG sensor embedded in the blade composite structure; receive the signal response from the FBG sensor indicative of the structural characteristic of the blade composite structure; and determine whether the structural characteristic of the blade composite structure is within the predetermined limit indicative of structural integrity of the blade composite structure.

In any prior system, the program instructions cause the processor to generate an output, responsive to determining whether the structural characteristic of the blade composite is within the predetermined limit.

In any prior system, the output is indicative of a maintenance or replacement message.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The present invention will be described hereinafter in greater detail as applied to the manufacture of a composite lightweight blade for use on an aircraft propulsor, such as a propeller driven by a turbine engine. However, it is to be understood that the present invention relates to the manufacture of any type of composite, lightweight propulsor blade, whether it is termed a propeller, a turboprop, or a fan blade and irrespective of whether the propulsor on which the blade is to be used comprises a propeller engine, a turboprop engine, a ducted or unducted turbofan engine, or other type of bladed propulsor.

Internal blade measurements made during the manufacturing processes could provide confirmation of successful manufacture, help to avoid product defects, and avoid material and financial waste. It is a common practice to perform periodic non-destructive examinations to monitor the health of a blade airfoil during the manufacturing process. Methods that have been used for such non-destructive examination include visual inspection, ultrasonic inspection, ping test inspection, and tap test inspection. Conventional application of these non-destructive examination techniques requires that the turbine rotor be stationary during the inspection. Existing online systems and methods are known for monitoring the blades' health while the machine is operating by using sensors allowing the monitoring of the blade frequency to detect potential blade damages.

Similar to measurement and monitoring limitations during manufacture, it may also be difficult to measure stresses and wear in the field. For example, internal temperatures, stresses and other parameters cannot be easily measured during both manufacture and operation of composite propeller blades, particularly for rotating applications. The lack of these measurements during operation can allow undetected propeller blade damage or wear.

It can be advantageous to incorporate one or more optical fiber sensors, such as, for example, one or more FBG sensors, into a composite propeller blade during manufacture of the blade. In some aspects, FBG sensors are immune to electromagnetic interference, which is an important aspect in creating reliable technologies in aerospace applications. As described above, propeller blades are often made of a composite material built up of layers of elements, including foam, carbon fiber layers, metal, and bonding agents. The manufacturing process of composite blades includes multiple curing processes, laminating steps, injection molding, and other processes. During curing there may be excessive temperature excursions due, for instance, to the exothermic nature of some curing reactions that can have an effect on the integrity of the finished product. Current methods may take blade samples from the manufacturing line to determine an aspect of the average product quality on the production line. However, without destructive testing it is not currently possible to evaluate some aspects of the integrity of the propellers with respect to each article of manufacture.

According to embodiments described herein, optical fibers and optical fiber sensors are incorporated directly into fiber windings of the propeller blades that reinforce the blade. In other aspects, optical fibers and optical fiber sensors are attached between layers of composite materials such as, for example, carbon fiber layers, foam cores, injected molded plastics, metal inserts, etc. By embedding the optical fibers and fiber sensors into one or more blades of a propeller, blade health is tested and monitored in during the manufacturing stages, and while the propeller blade is being used in the field (e.g., while operational in flight).

After monitoring the propeller blades during the manufacturing process, there are significant benefits to field monitoring the blades to determine where the blades are in the anticipated useful life of each blade while in use and to detect high loading conditions. Blade weakening and vibrational monitoring over time may be informative to maintenance personnel for repair and or replacement of the blades or supporting members. Field conditions can vary over time, and cumulative wear can affect each respective propeller according to field use conditions. A control system that monitors and determines a severity of field conditions (vibrations, temperature, stress, etc.) is useful to track and predict the useful life of the blade.

Figure 1:
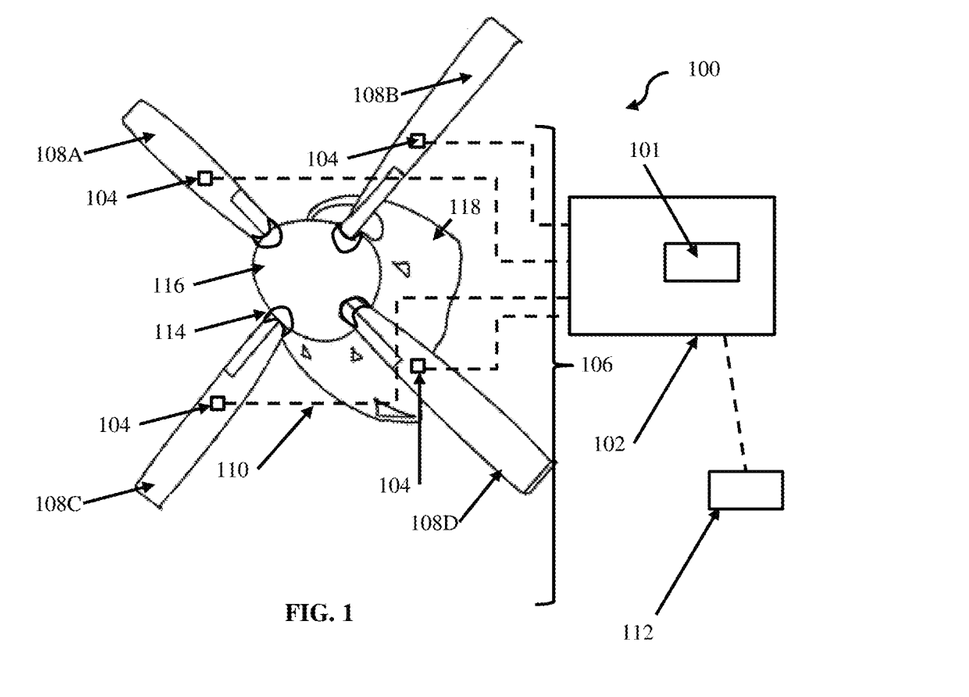
FIG. 1 is rotor monitoring system according to an exemplary embodiment.

FIG. 1 depicts a rotor monitoring system 100, according to an exemplary embodiment. System 100 includes a processor 101 that is operative as part of a controller 102. A power system 112 is operatively connected to the controller 102. The controller 102 is operatively connected to one or more sensors 104 in communication with at least one embedded sensor in the propeller blade 108. For example, as shown in FIG. 1, the controller 102 is connected to and in communication with a plurality of sensors 104 on each of a plurality of propeller blades 108A, 108B, 108C, and 108D. Although sensors 104 are depicted at an approximate midpoint of each of the blades 108A-108D, it should be appreciated that each blade in system 100 may include one sensor or a plurality of sensors at any location of the respective blade. The system 100 includes one or more communication channels 110 connecting the sensors 104 to the controller 102.

Figure 6:
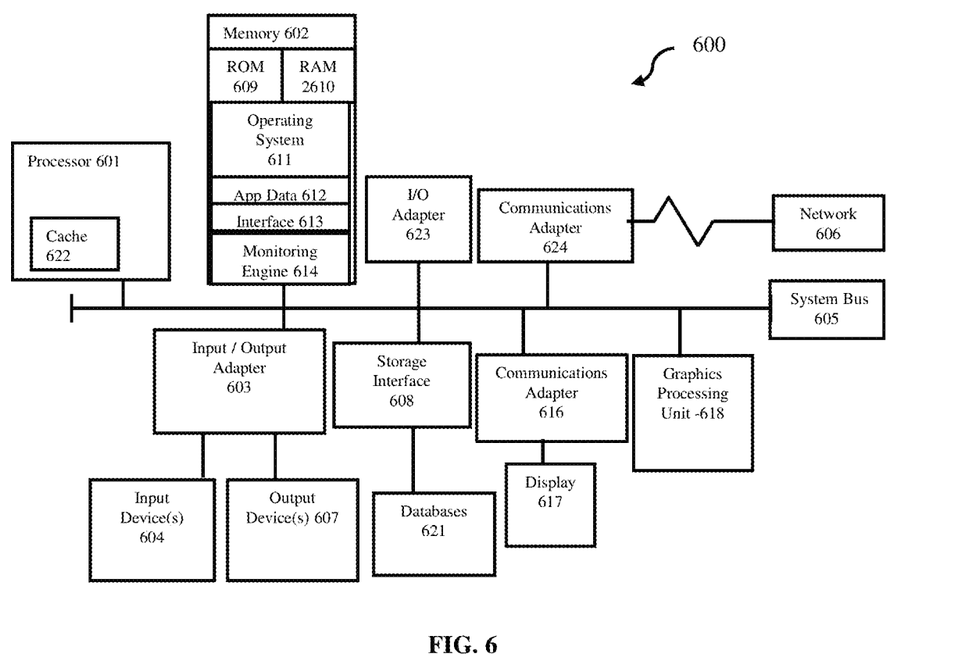
FIG. 6 is a block diagram of an exemplary computing system for practicing one or more embodiments described herein.

In some aspects, the controller 102 may be a computing system such as the one described hereafter with respect to FIG. 6. The controller 102 includes one or more processors 101. According to one embodiment, the system 100 includes the controller 102 configured to measure and record real-time signal response of blade 108A-108D (for example, microstrain or "µstrain") during ground and flight operations. In some aspects, the controller 102 retrieves one or more signals from the sensor 104 and compares the sensor reading with a predefined blade response value to determine whether the blade response is within a predefined (tolerable) limit of response values indicative of structural integrity. The predefined limit may be, for example, a predefined upper and/or lower limit for strain, a predefined upper and/or lower limit for accumulated strain over time, a predefined upper and/or lower limit for longitudinal or lateral deformation, a predefined upper and/or lower temperature limit, a predefined upper and/or lower temperature differential, etc.

In other aspects, the controller 102 may compare the retrieved sensor value to the one or more predefined limits.

In another aspect, the controller 102 includes a computer readable memory (e.g., memory 602, as shown with respect to FIG. 6) storing instructions to perform a method for monitoring the blade health. For example, the memory 602 may store one or more algorithms for calculating a life consumption for each of the blades 108A-108D on the propeller 106, and output a message to an operatively connected control module in the cockpit of the aircraft (not shown). The cockpit control module can be configured to output the message to a user or maintenance personnel. According to another embodiment, the controller 102 outputs and transmits the message to the user or maintenance personnel. The transmission may be, for example, a wired or wireless message indicating one or more measurements made by the sensor 104, and/or an accumulated measurement of multiple readings indicative of structural integrity (and/or cumulative wear) of one or more of the blades 108A-108D.

Each of the propeller blades 108A-108D (hereafter blades 108) includes a tulip 114 connecting it to a propeller hub (not shown), which is covered by the propeller spinner 116. A tulip 114 is a metal retention member formed by conventional techniques from steel, aluminum, titanium or other suitably strong metal or composite material, with a proximal end adapted to provide a retention structure for mounting into the propeller hub 116 and a distal end which is flared to provide a tulip like cavity opening axially outward to securely retain the blade 108. After the tulip 114 is treated for corrosion protection by conventional techniques, an adhesive is applied in the inner surface of the retention tulip bonding the cavity of the tulip to a preformed core of lightweight cellular material, such as a polyurethane foam, a polyisocyanurate foam or other lightweight foam material. In some aspects, the sensor 104 may be configured to lay between the tulip 114 and one or more layers of the cellular material used to adhere the blade 108 to the tulip 114.

The optical fibers and fiber sensors (hereafter collectively "sensors 104) may be directly connected to the controller 102, which is configured as a monitoring system separate from the blades 108. In other aspects, the controller 102 may be embedded in the propeller 106 in one or more of the blades 108, within the spinner 116, or within the hub beneath the spinner 116 (not shown). For example, for use during propeller operation in the field, the controller 102 is embodied as an electro-optic interface circuit (EO circuit) built into a foam core of a propeller blade (shown in FIGS. 3A-3C), the tulip 114 of the propeller blade, or another part of the blade 108, spinner 116 or hub (not shown).

According to one embodiment, the controller 102 converts the optical signals from the fiber sensors into electrical signals that are either wirelessly transmitted from the rotating portion of the propeller 106 to the non-rotating portion of the propeller or non-rotating mass 118, or conducted from the blade 108 to a non-rotating mass 118 through wires and slip rings used for blade de-icer power (not shown). Although not shown and described herein, methods for passing signals from a rotating portion to a non-rotating portion are known by those skilled in the art.

According to another embodiment, the power system 112 supplies power to the EO circuit. In one aspect, the power system 112 is embodied as a blade de-icer power connection. In another aspect, the power system 112 supplies power to the EO circuit through local energy harvesting from the blade 108 via a piezoelectric chip or other known energy harvesting mechanism. For example, local energy harvesting can be supplied by one or more devices such as a piezoelectric generator harvesting cyclic strain energy, a thermoelectric generator harvesting thermal gradient energy, or a solar cell harvesting optical energy.

The sensor 104 may be an FBG sensor, or an Extrinsic Fabry-Perot interferometric (EFPI) sensor configured to monitor the health of a blade 108 composite structure. As used herein, "health" is in reference to a structural integrity of the blade 108. In some aspects, FBG sensors and EFPI sensors can be used for structural health monitoring, and to reveal the residual stress build-up during the fabrication process, which may be indicative of blade health and a remaining useful life of one or more of the blades 108. Therefore, embodiments described herein monitor composite structures in the blades 108 from fabrication to use in-service for damage and/or remaining useful life in service.

Figure 2:
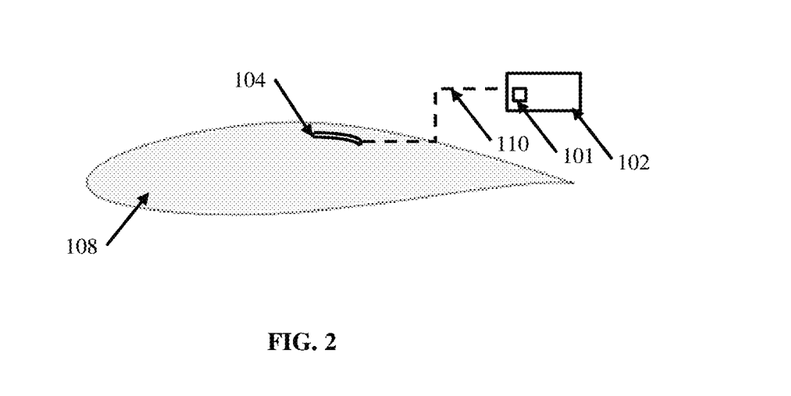
FIG. 2 is a section view of a propeller blade configured with an embedded sensor according to an exemplary embodiment.

FIG. 2 is a section view of a propeller blade 108 configured with an embedded sensor 104, according to an exemplary embodiment. As shown in FIG. 2, the sensor 104 is fixed to an interior or exterior portion of the blade 108, and configured to determine one or more of a temperature, a strain, and a deformation. The sensor 104 transmits a signal via the communication channel 110, which may be wired and/or wirelessly connected to the processor 101 of the controller 102. In some aspects, the sensor 104 may be configured at the surface of the blade 108, or near the surface 108 under a layer of the composite structure.

Figure 3A:
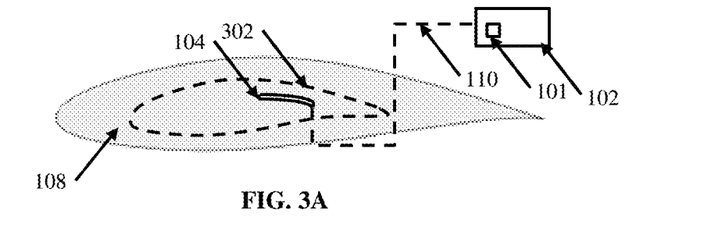
FIG. 3A is a section view of a propeller blade configured with an embedded sensor according to an exemplary embodiment.

FIG. 3A depicts a section view of a propeller blade 108 configured with an embedded sensor 104, according to an exemplary embodiment. As shown in FIG. 3A, the sensor 104 is embedded in an interior portion of the blade 108, and configured to determine one or more of a temperature, a strain, and a deformation. The sensor 104 transmits a signal via the communication channel 110, which may be wired and/or wirelessly connected to the processor 101 of the controller 102.

Figure 3B:
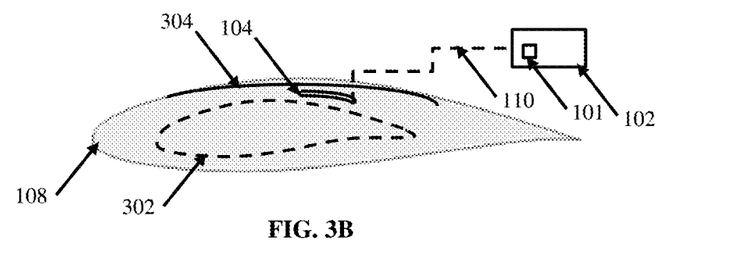
FIG. 3B is a section view of a propeller blade configured with an embedded sensor between a layer of carbon fiber and a foam core according to an exemplary embodiment.

FIG. 3B is a section view of a propeller blade 108 configured with an embedded sensor 104 between a layer of a fiber wrap 304 and a spar 302 which may be, for example a foam core. In one aspect, the sensor 104 is embedded between the spar 302 and the fiber wrap 304 during manufacture of the blade 108. For example, to complete the manufacture of the spar 302, the spar is placed in a braiding machine of a commercially available type to serve as a mandrel on which a dry, multi-layer woven fiber wrap 304 is laid-up. The dry fiber wrap 304 includes a plurality of layers of angularly woven structural fibers, such as, for example graphite fibers, Kevlar aramid fibers, fiberglass fibers or combinations thereof, which are braided over the length of the spar subassembly from the retention tulip 114 to the tip of the distal end of the spar 302. According to one embodiment, the sensor 104 is embedded between the fiber wrap 304 and the spar 302. In some aspects, the sensor 104 may determine the residual stress and temperature to monitor whether the manufacturing steps are properly performed (polymerization, following the progression of the resin in the structure).

Figure 3C:
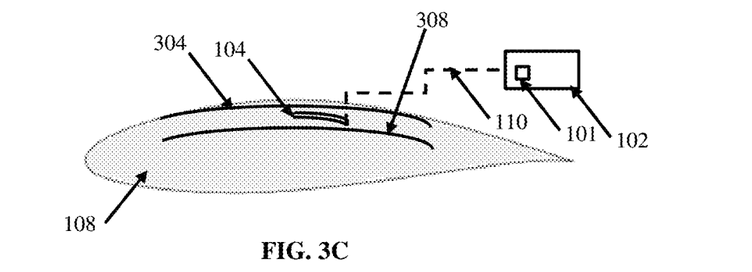
FIG. 3C is a section view of a propeller blade configured with an embedded sensor between two layers of carbon fiber according to an exemplary embodiment.

FIG. 3C is a section view of a propeller blade 108 configured with an embedded sensor 104 between two layers of fiber wrap (a first layer of fiber wrap 304 and a second layer of fiber wrap 308) according to an exemplary embodiment. To enhance and improve the spanwise stiffness and strength of the blade 108, dry plies of substantially unidirectional structural fibers (e.g., fiber wrap 304) are laid-up during the braiding process between successive braided layers of fiber wrap (e.g., 304 and 308). The structural fibers of the plies may also include fibers, graphite fibers, Kevlar aramid fibers, fiberglass fibers or combinations thereof. Accordingly, sensor 104 may determine the residual stress, temperature, axial strain, multi axial strains.

Figure 4:
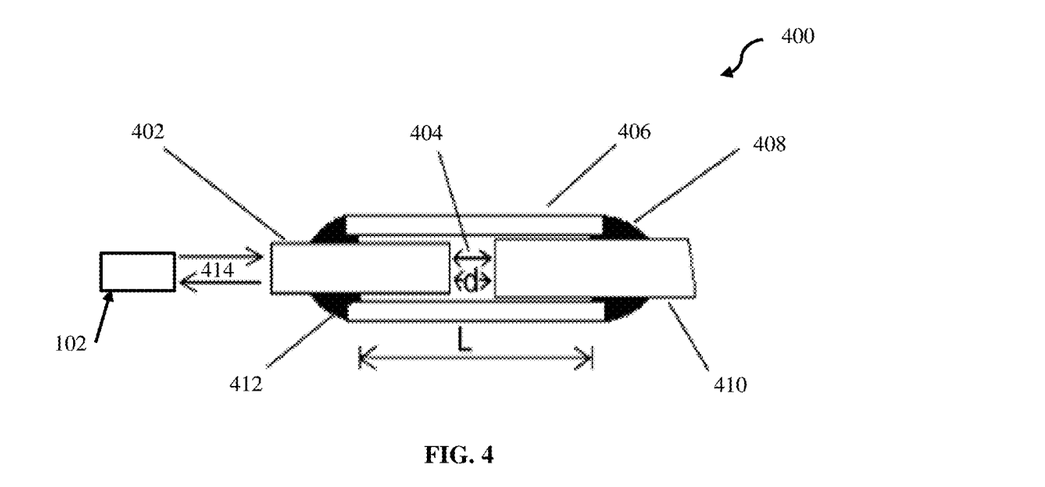
FIG. 4 is an embedded sensor according to an exemplary embodiment.

FIG. 4 depicts an embedded sensor 400, according to an exemplary embodiment. In one aspect, EFPI sensors are used to monitor the temperature and strain in the blade 108 composite structure by sending and receiving signals to the controller 102 via an optical fiber channel 414. An EFPI is typically made of a transparent plate with two reflecting surfaces 402 and 410, or two parallel highly reflecting mirrors. Its transmission spectrum as a function of wavelength exhibits peaks of large transmission corresponding to resonances of the etalon. Etalons are widely used in telecommunications, lasers and spectroscopy to control and measure the wavelengths of light. The heart of the Fabry-Pérot interferometer is a pair of partially reflective glass optical flats spaced micrometers to centimeters apart, with the reflective surfaces facing each other. Alternatively, a Fabry-Pérot etalon uses a single plate with two parallel reflecting surfaces.

In other aspects, the embedded sensor 400 may be an FBG sensor. An FBG is a type of distributed Bragg reflector constructed in a short segment of optical fiber that reflects particular wavelengths of light and transmits all others. FBGs create a periodic variation in the refractive index of the fiber core. The periodic variation generates a wavelength-specific dielectric mirror. An FBG can therefore be used as an inline optical filter to block certain wavelengths, or as a wavelength-specific reflector. In some aspects the embedded sensor 400 may be either an FBG sensor or an EFPI sensor.

There are advantages of EFPIs over conventional electrical strain gauges, such as linearity in response over many orders of magnitude. Furthermore, EFPIs can be easily embedded into materials to provide damage detection or internal strain field mapping. In a similar way, FBGs can provide damage detection or internal strain with a solid optical fiber having a periodic refractive index variation that can also supply a signal indicating changes in strain and temperature. Both sensor types are light yet rugged, low cost, and are unperturbed by electro-magnetic interference (EMI).

For example, with respect to an EFPI sensor, the basic sensing principle is that the cavity length d of the sensor 400 is changed when mechanical and thermal strains are applied to the sensor 400. The sensor is attached to the underlying substrate, which may be, according to embodiments, a fiber wrap 304, 308, etc., or some other member of the blade 108. The length L of the fibers 406 are lengthened or shortened due to an adhered portion 408, 412 and securely attached to the substrate 402, 410. As the sensor changes in length due to strain and/or temperature changes of the attached substrate 402, 410, the differential is correlated to measurements.

Temperature, strain, and other parameters measured inside a composite blade during manufacture provide data on quality, process deviations and potential product improvement. It is superior to current external or destructive methods.

The fiber sensors with electro-optic circuits and data transmission can report operational blade data to detect excess stress, fatigue, and other parameters that could identify blade abnormalities before they result in unscheduled maintenance or in-flight failure.

Figure 5:
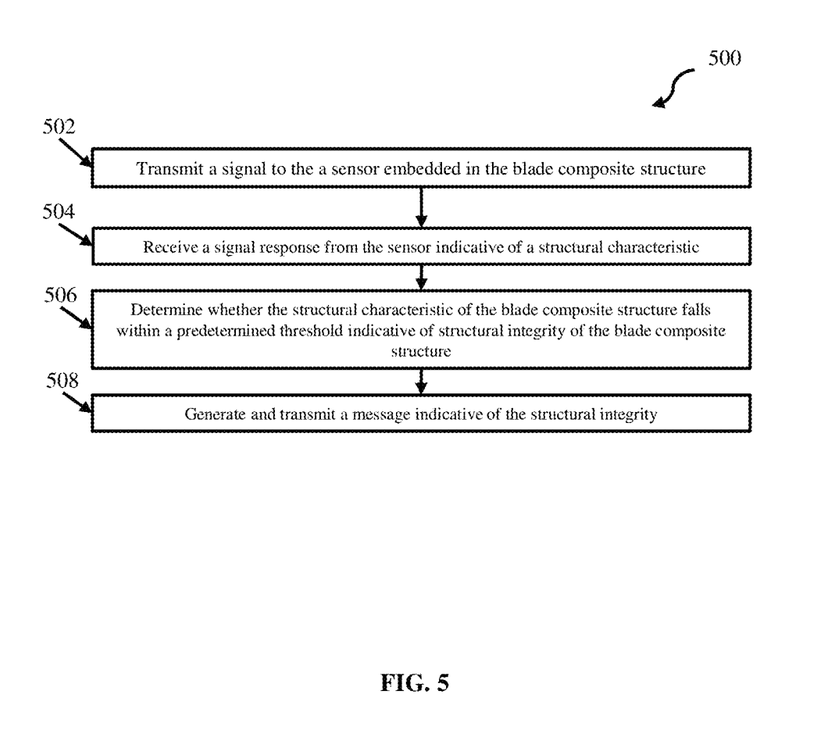
FIG. 5 is a flow diagram of a method for monitoring a propeller blade according to an exemplary embodiment.

FIG. 5 depicts a flow diagram of a method for monitoring structural integrity of the blade 108. As shown in block 502, the processor 101 transmits a signal to the sensor 104 embedded in the blade composite structure (e.g., blade 108).

As shown in block 504, the processor 101 receives a signal response from the sensor 104 indicative of a structural characteristic. For example, the signal may indicate an overall strain, temperature, temperature differential, a count of temperature differential exceeding a predetermined threshold, a count of strain exceeding a predetermined threshold, a quantified measurement of strain, a quantified measurement of cumulative strain, etc.

Using the signal response, as shown in block 506 the processor 101 determines whether the structural characteristic of the blade composite structure falls within a predetermined threshold indicative of structural integrity. For example, if the structure has exceeded a predetermined limit for strain during a certain time, there is a likelihood of structural failure over time. In another example, when the cumulative strain reaches another threshold value, the expected life remaining in the blade (e.g., the operation of the blade in the field that meets some predetermined response).

As shown in block 508, the processor 101 generates and transmits a message indicative of the structural integrity of the blade 108. The message may indicate a need for repair, replacement, or another message indicative of overall integrity of the blade 108.

FIG. 6 illustrates a block diagram of an exemplary computing environment and computer system 600 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, minicomputer, or mainframe computer, an embedded EO circuit, etc. Computer system 600 can embody a general-purpose computer. In another exemplary embodiment, the implementation can be part of an embedded system, such as an EO circuit described above, a system on a chip, etc.

As shown in FIG. 6, the computer 600 includes processor 601. Computer 600 also includes memory 602 communicatively coupled to processor 601, and one or more input/output adapters 603 that can be communicatively coupled via system bus 605. Memory 602 can be communicatively coupled to one or more internal or external memory devices via a storage interface 608. Communications adapter 616 can communicatively connect computer 600 to one or more networks 606. System bus 605 can communicatively connect one or more user interfaces via input/output (I/O) adapter 603. I/O adapter 603 can connect a plurality of input devices 604 to computer 600. Input devices can include, for example, a keyboard, a mouse, a microphone, a sensor, etc. System bus 605 can also communicatively connected to one or more output devices 607 via I/O adapter 603. Output device 607 can include, for example, a display, a speaker, a touchscreen, etc.

Processor 601 is a hardware device for executing program instructions (aka software), stored in a computer-readable memory (e.g., memory 602). Processor 601 can be any custom made or commercially available processor, a central processing unit (CPU), a plurality of CPUs, an auxiliary processor among several other processors associated with the computer 600, a semiconductor based microprocessor (in the form of a microchip or chip set), or generally any device for executing instructions. Processor 601 can include a cache memory 622, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 622 can be organized as a hierarchy of more cache levels (L1, L2, etc.).

Processor 601 can be disposed in communication with one or more memory devices (e.g., random access memory (RAM) 609, read only memory (ROM) 610, one or more external databases 621, etc.) via a storage interface 608. Storage interface 608 can also connect to one or more memory devices including, without limitation, one or more databases 621, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc.

Memory 602 can include RAM 609 and ROM 610. RAM 609 can be any one or combination of volatile memory elements (e.g., DRAM, SRAM, SDRAM, etc.). ROM 610 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 602 can incorporate electronic, magnetic, optical, and/or other types of non-transitory computer-readable storage media. Memory 602 can also be a distributed architecture, where various components are situated remote from one another, but can be accessed by processor 601.

The instructions in memory 602 can include one or more separate programs, each of which can include an ordered listing of computer-executable instructions for implementing logical functions. In the example of FIG. 6, the instructions in memory 602 can include an operating system 611. Operating system 611 can control the execution of other computer programs and provides scheduling, input-output control, file and data management, memory management, and communication control and related services.

The program instructions stored in memory 602 can further include application data 612, and for a user interface 613.

Memory 602 can also include program instructions for sensing strain, temperature, and other physical characteristics.

I/O adapter 603 can be, for example but is not limited to, one or more buses or other wired or wireless connections. I/O adapter 603 can have additional elements (which are omitted for simplicity) such as controllers, microprocessors, buffers (caches), drivers, repeaters, and receivers, which can work in concert to enable communications. Further, I/O adapter 603 can facilitate address, control, and/or data connections to enable appropriate communications among the aforementioned components.

I/O adapter 603 can further include a display adapter coupled to one or more displays. I/O adapter 603 can be configured to operatively connect one or more input/output (I/O) devices 607 to computer 600. For example, I/O 603 can connect a keyboard and mouse, a touchscreen, a speaker, a haptic output device, or other output device. Output devices 607 can include but are not limited to a printer, a scanner, and/or the like. Other output devices can also be included, although not shown. Finally, the I/O devices connectable to I/O adapter 603 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 600 can include a mobile communications adapter 624. Mobile communications adapter 623 can include GPS, cellular, mobile, and/or other communications protocols for wireless communication.

In some embodiments, computer 600 can further include communications adapter 616 for coupling to a network 606.

Network 606 can be an IP-based network for communication between computer 600 and any external device. Network 606 transmits and receives data between computer 600 and devices and/or systems external to computer 600. In an exemplary embodiment, network 606 can be a managed IP network administered by a service provider. Network 606 can be a network internal to an aircraft, such as, for example, an avionics network, etc. Network 606 can be implemented in a wireless fashion, e.g., using wireless protocols and technologies, such as WiFi, WiMax, etc. Network 606 can also be a wired network, e.g., an Ethernet network, an ARINC 429 network, a controller area network (CAN), etc., having any wired connectivity including, e.g., an RS232 connection, R5422 connection, etc. Network 606 can also be a packet-switched network such as a local area network, wide area network, metropolitan area network, Internet network, or other similar type of network environment. The network 606 can be a fixed wireless network, a wireless local area network (LAN), a wireless wide area network (WAN) a personal area network (PAN), a virtual private network (VPN), intranet or other suitable network system.

Network 606 can operatively connect computer 600 to one or more devices including device 617, device 618, and device 620. Network 606 can also connect computer 600 to one or more servers such as, for example, server 619.

The instructions in the memory 602 can further include a basic input output system (BIOS) (omitted for simplicity). The BIOS is a set of routines that initialize and test hardware at startup, start operating system 611, and support the transfer of data among the operatively connected hardware devices. The BIOS is typically stored in ROM 610 so that the BIOS can be executed when computer 600 is activated. When computer 600 is in operation, processor 601 can be configured to execute instructions stored within the memory 602, to communicate data to and from the memory 602, and to generally control operations of the computer 600 pursuant to the instructions.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade for a propeller comprising:
   a blade composite structure;
   an Extrinsic Fabry-Perot Interferometric (EFPI) sensor embedded in the blade composite structure, the sensor configured to:
   receive a signal from a controller operatively connected to the EFPI sensor; and
   transmit a signal, responsive to the received signal, to a processor operatively connected to the sensor, wherein the signal response is indicative of a stress measurement indicating a structural characteristic of the blade composite structure;
   wherein the signal response provides information to determine, based on the signal response, whether the structural characteristic of the blade composite structure is within a predetermined limits indicative of structural integrity of the blade composite structure;
   wherein the blade composite structure includes a spar and one or more fiber wrap layers applied to the spar, the EFPI sensor embedded between the spar and the one or more fiber wrap layers.

2. The blade of claim 1, wherein the blade composite structure comprises a first layer and a second layer in connection with the first layer, and the EFPI sensor is embedded between the first and second layers.

3. The blade of claim 1, wherein the signal response is indicative of a residual stress build-up in the blade composite structure.

4. The blade of claim 3, wherein the signal response is indicative of microstrain (µstrain).

5. The blade of claim 1, wherein determining the structural characteristic comprises:
   retrieving, via the controller, one or more signal responses operatively saved to a computer-readable memory;
   evaluating, via the controller, a cumulative residual stress build-up based on the one or more signal responses; and
   outputting, using the controller, a message indicative of the cumulative residual stress build up.

6. A method for monitoring a physical characteristic of a blade composite structure;
   transmitting, via a controller, a signal to an Extrinsic Fabry-Perot Interferometric (EFPI) sensor embedded in the blade composite structure;
   receiving, using the controller, a signal response from the EFPI sensor indicative of a stress measurement indicating a structural characteristic of the blade composite structure; and
   determining, using the controller, based on the signal response; whether the structural characteristic of the blade composite structure is within a predetermined limit indicative of structural integrity of the blade composite structure;
   wherein the blade composite structure includes a spar and one or more fiber wrap layers applied to the spar, the EFPI sensor embedded between the spar and the one or more fiber wrap layers.

7. The method of claim 6, wherein the blade composite structure comprises a first layer and a second layer in connection with the first layer, and the EFPI sensor is embedded between the first and second layer.

8. The method of claim 6, wherein the signal response is indicative of a residual stress build-up in the blade composite structure.

9. The method of claim 8, wherein the signal response is indicative of microstrain (µstrain).

10. The method of claim 6, wherein determining the structural characteristic comprises:
    retrieving, via the controller, one or more signal responses operatively saved to a computer-readable memory;
    evaluating, via the controller, a cumulative residual stress build-up based on the one or more signal responses;
    outputting, using the controller, a message indicative of the cumulative residual stress build up; and
    transmitting, using the controller, the message to a second processor.

11. A system for monitoring a physical characteristic of a blade composite structure comprising:
    a blade composite structure;
    an Extrinsic Fabry-Perot Interferometric (EFPI) sensor embedded in the blade composite structure; and
    a controller operatively connected to the sensor and configured to:
    transmit a signal to the sensor using a processor;
    receive, using the processor, a signal response from the sensor indicative of a stress measurement indicating a structural characteristic of the blade composite structure; and
    determine, using the processor, based on the signal response; whether the structural characteristic of the blade composite structure is within a predetermined limit indicative of structural integrity of the blade composite structure;
    wherein the blade composite structure includes a spar and one or more fiber wrap layers applied to the spar, the EFPI sensor embedded between the spar and the one or more fiber wrap layers.

12. The system of claim 11, wherein the blade composite structure comprises a first layer and a second layer in connection with the first layer, and the EFPI sensor is embedded between the first and second layers.

13. The system of claim 11, wherein the signal response is indicative of a residual stress build-up in the blade composite structure.

14. The system of claim 11, wherein the signal response is indicative of µ strain.

15. The system of claim 11, wherein determining the structural characteristic comprises:
    retrieving, via the controller, one or more signal responses operatively saved to a computer-readable memory;
    evaluating, via the controller, a cumulative residual stress build-up based on the one or more signal responses;

outputting, using the controller, a message indicative of the cumulative residual stress build up; and transmitting, using the processor, the message to a second processor.

* * * * *